Figure 1:
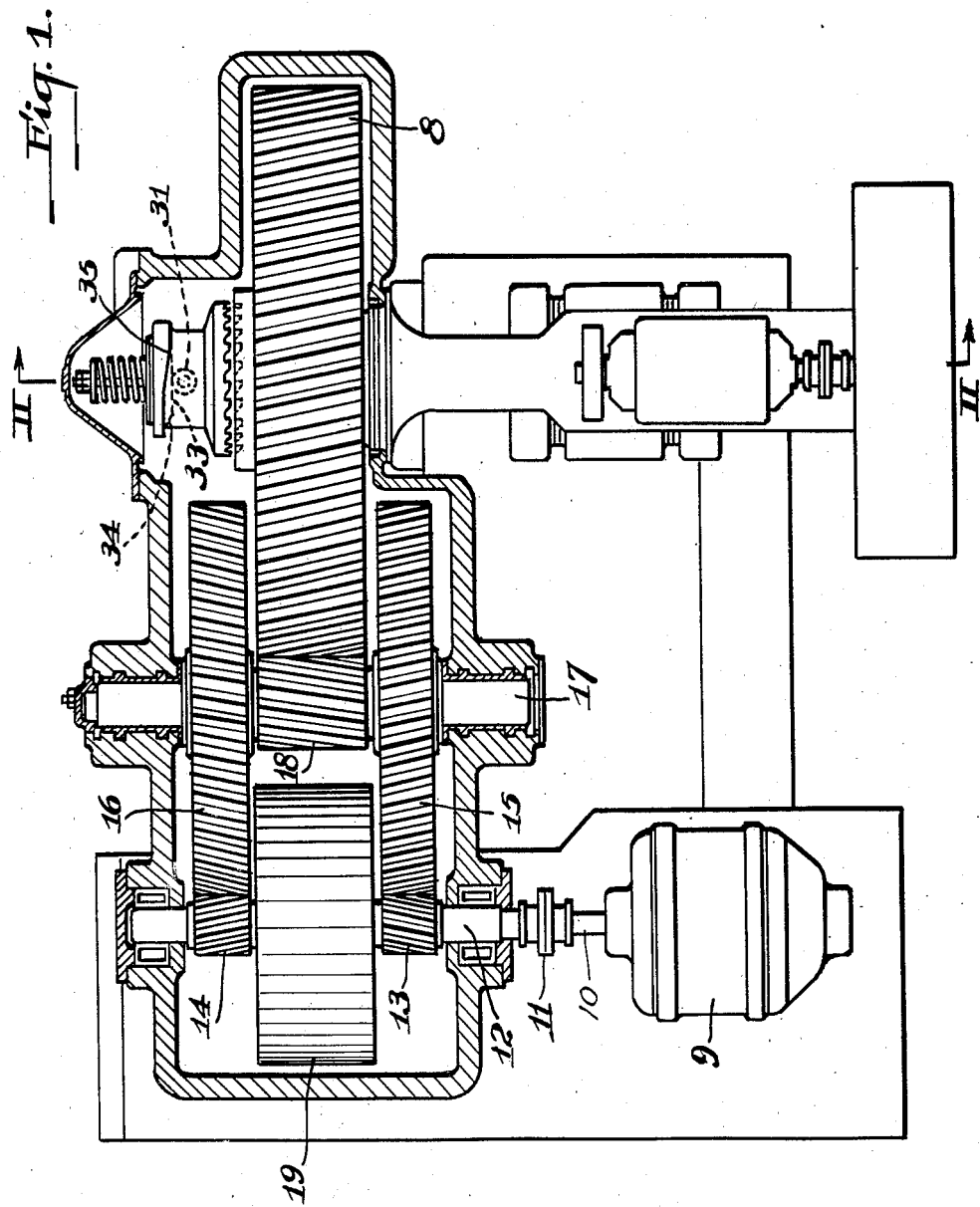

June 23, 1931. J. A. SMITMANS 1,811,655
CLUTCH MECHANISM
Filed Sept. 11, 1929    3 Sheets-Sheet 1

WITNESS
A.B.Wallace.

INVENTOR
John A. Smitmans
by Brown & Critchlow,
his attorneys.

June 23, 1931. J. A. SMITMANS 1,811,655
CLUTCH MECHANISM
Filed Sept. 11, 1929 3 Sheets-Sheet 2

WITNESS
A B Wallace

INVENTOR
John A. Smitmans
by Brown & Critchlow,
his attorneys

June 23, 1931.  J. A. SMITMANS  1,811,655
CLUTCH MECHANISM
Filed Sept. 11, 1929  3 Sheets-Sheet 3

WITNESS
a B Wallace.

INVENTOR
John A. Smitmans
by Brown & Critchlow,
his attorneys

Patented June 23, 1931

1,811,655

UNITED STATES PATENT OFFICE

JOHN A. SMITMANS, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA

CLUTCH MECHANISM

Application filed September 11, 1929. Serial No. 391,835.

The invention relates to clutches for use primarily in heavy-duty intermittently-operating machines, as for example presses and metal punching and shearing machines.

A machine of this type usually has a power shaft provided with a crank or eccentric for intermittently reciprocating a head to which a tool is attached. To rotate the shaft, a continuously rotated driving clutch member is customarily rotatably mounted on it, and a driven clutch member is keyed to the shaft for rotation with and longitudinal movements on it, the adjacent faces of the clutch members being provided with teeth which are brought into engagement with each other when the driven member is moved longitudinally against the driving member. Usually the driven member is yieldingly urged towards the driving member and against a finger which engages a shifting cam formed on the driven member, the finger being movable to first release the driven member so that it may be moved to engage the driving member, and to thereafter engage the shifting cam to move the driven member from the driving member.

In heavy duty machines of this type, the mass of the power shaft, and of the movable parts connected to and actuated by it, is so great that the force required to set it in motion not infrequently breaks teeth of the clutch when its stationary driven member is brought into engagement with its continuously rotating driving member. Furthermore, when torque is then applied by the driving to the driven member, the frictional resistance between the contacting faces of the clutch teeth is so great that it is very difficult to disengage the clutch members at the completion of a cycle of operation. To overcome these difficulties, it has been proposed to eliminate the clutch entirely and to rotate the power shaft by direct connections to an intermittently operated motor. However, to do this successfully requires a very powerful and costly motor in addition to other expensive electric equipment.

The object of the invention is to provide a clutch of general applicability, but particularly suitable for the use explained, so formed and controlled that its elements may be brought into engagement with each other with little if any shock, and may be easily disengaged, the clutch and its associated parts being relatively inexpensive to manufacture and involving a small operating cost.

Figure 2:
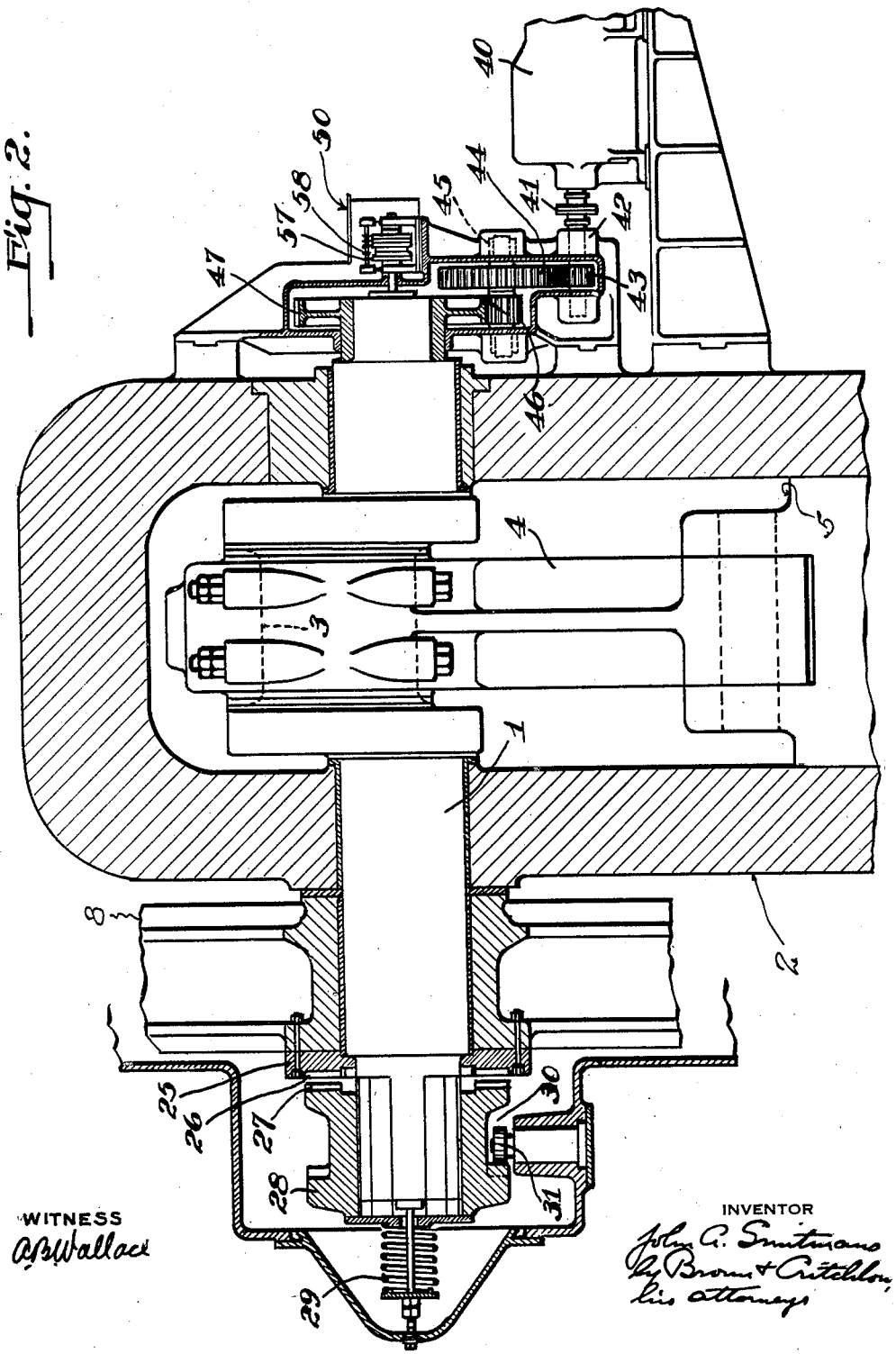
Figure 3:
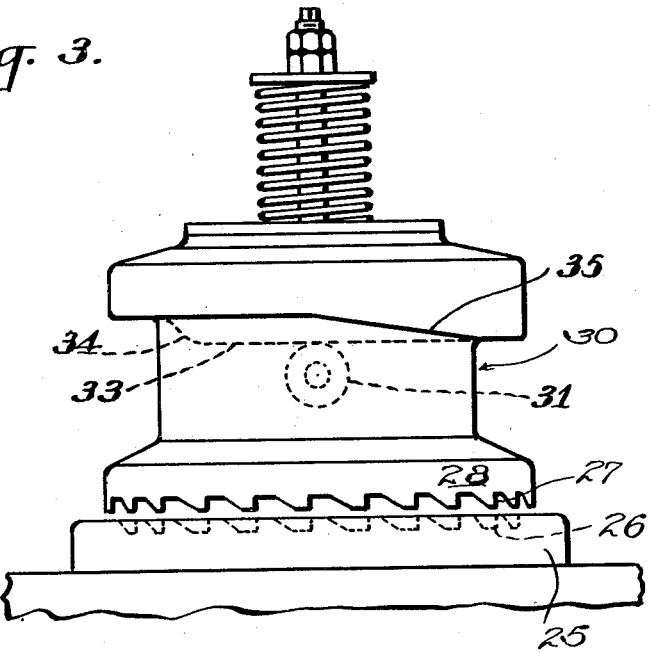

The invention is illustrated in its applicability to a heavy and powerful machine for shearing rolling mill blooms and slabs of large cross sectional areas, Fig. 1 of the drawings being a plan view of such machine; Fig. 2 being a vertical sectional view of the machine to enlarged scale taken on the line II—II, Fig. 1; Fig. 3 a plan view of a clutch shown at the left portion of Fig. 2; and Fig. 4 a wiring diagram of electric control connections.

The clutch provided according to this invention includes a continuously rotatable driving member, a normally stationary but rotatable driven member, and means for moving one of these into engagement with the other. While either of these members may be so moved, and in any suitable or desired way, it is preferred to mount the driven member upon a power shaft for longitudinal movement on and rotation with it, and to urge it yieldingly towards the driving member which is preferably rotatably mounted upon the power shaft. Instead of bringing the clutch members into engagement with each other while the driven member is not rotating, as is the customary practice, means are provided for imparting initial rotation to the driven member in the direction of rotation of the driving member prior to effecting such engagement. In this way, the driven member may be brought up to, or nearly to, the rate of continuous rotation of the driving member so that the engagement of the two with each other is not accompanied by the customary clutch-engaging and teeth breaking or shattering shock.

When, as is preferred, the driven member is moved to and from the driving member for making and breaking clutch engagement, it is preferred to provide a supplemental motor for imparting initial rotation to the power shaft, which in turn imparts initial rotation to the driven clutch member. To facilitate the disengagement of the clutch members, means are provided for increasing the speed of the supplemental motor after the completion of each power stroke of the machine, the arrangement being such that the power shaft, and in consequence thereof the driven clutch member, is then rotated by the supplemental motor at a speed approaching or slightly in excess of that of the rotation of the driving clutch member so that frictional engagement between the clutch members is so reduced or eliminated that they can be easily disengaged. These and other features of the invention will now be explained with reference to its illustrative embodiment.

Referring first to Figs. 1 and 2, a power shaft 1 is rotatably mounted in a machine frame or housing 2, and is provided with a crank or eccentric 3 in which there is connected the upper end of a pitman 4 attached at its lower end to a head 5 which is vertically reciprocated by the rotation of the shaft, the head being provided in this instance with a shear blade. Rotatably mounted on a projecting end of shaft 1, there is a gear 8 which forms the last of a train of reduction gears extending from a relatively high speed motor 9. The armature shaft 10 of this motor is connected through a flexible coupling 11 to a shaft 12 rotatably mounted in the machine frame and provided adjacent to its bearings with pinions 13 and 14 which mesh with gears 15 and 16, respectively, these gears being attached to a shaft 17 rotatably mounted in the machine frame and provided with a pinion 18 meshing with gear 8. Between pinions 13 and 14 there is attached to shaft 12 a flywheel 19, the momentum of which, and of the rotatable parts connected to it, adds materially to the power applied to the working stroke of the shear.

Attached to the hub of gear 8 there is a clutch driving member 25 provided on its vertical face with clutch teeth 26 adapted to engage clutch teeth 27 formed on the vertical face of a driven clutch member 28 mounted for longitudinal movement on and rotation with shaft 1. Driven clutch member 28 is yieldingly urged towards driving member 25 by a spring 29. Within an annular groove 30 formed in the periphery of driven member 28 there is a fixed finger 31 provided at its upper end with a roller which normally bears against a shifting cam 33 formed on the driven member. When the machine is idle, that is to say, when shaft 1 is in the position shown in Fig. 1 with its eccentric in its uppermost dead center position, finger 31 bears upon cam 33 at or about the position shown in Fig. 3. Rotation of shaft 1, in the manner presently to be explained, causes cam 33 to ride upon finger 31 until such finger reaches and passes over a shoulder 34 of the cam, at which time spring 29 becomes effective to move driven member 28 towards and into engagement with driving member 26. After the completion of the downward stroke of the machine, and at a period in the cycle of operation of the machine presently to be explained, finger 31 engages an inclined portion 35 of the shifting cam to cause driven member 28 to become disengaged from the driving member.

As previously stated, a supplemental motor is preferably provided for effecting initial rotation of shaft 1 in the direction of rotation of driving member 25 to bring driven member 28 up to, or substantially to, the rate of rotation of the driving member. For this purpose, a supplemental motor 40 is connected by a flexible coupling 41 to a shaft 42 provided with a pinion 43 which meshes with a gear 44 attached to a pinion 46 meshing with a gear 47 attached to an end of power shaft 1. In addition to imparting initial rotation to power shaft 1, provision is made for causing this supplemental motor to itself rotate the power shaft during the final phase of a cycle of its operation to relieve the frictional contact between the engaging teeth of the clutch members so that the driven may be readily disengaged from the driving member.

The supplemental motor may also be used for applying a braking action to the downward stroke of the reciprocating head after the eccentric has been moved off its dead center and before the shear on the reciprocating head begins to cut a blank, it being understood that in a heavy-duty machine of this character the weight of the reciprocating head and its attached parts so accelerate the rotation of a power shaft that the driven clutch member rotates faster than the driving member, causing temporary disengagement of the clutch teeth and subsequent shock when their engagement is later established. While springs and dash pots are sometimes used for thus retarding rotation of a power shaft on the downward stroke of a reciprocating head, and may be here used for that purpose, part of such retardation may be effected by the supplemental motor.

Figure 4:
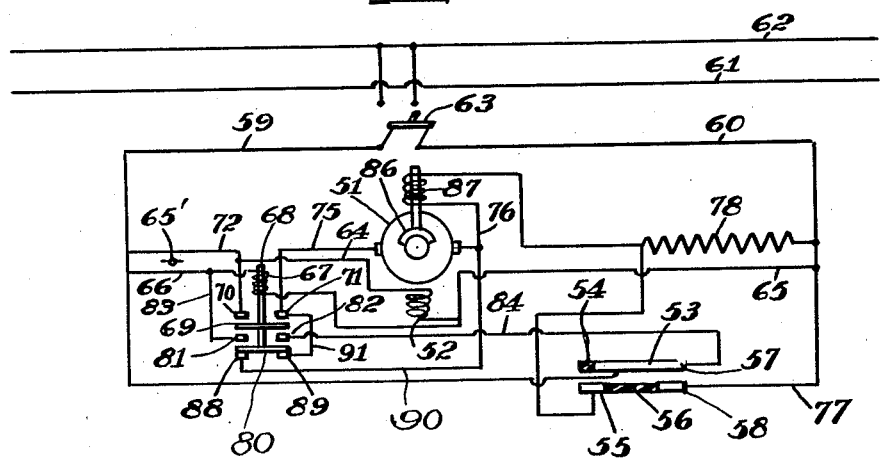

For thus controlling and operating motor 40, a contactor drum 50 is directly attached to the end of power shaft 1 for simultaneous rotation with it, its general construction and the electrical equipment associated with it being diagrammatically illustrated in Fig. 4, to which reference is now made. The motor is illustrated as comprising an armature 51 and a field 52, while rotatable drum 50 is illustrated in developed form as comprising a conducting band 53 interrupted by a block of insulation 54, and a conducting band 55 interrupted by a block of insulation 56. Arranged to bear on these annular bands there are fixed contactors 57 and 58. Conductors 59 and 60 leading to the motor may be placed in circuit with line wires 61 and 62 by a switch 63. When this switch is closed, field 52 of the motor is continuously excited through conductors 64 and 65 connected as shown to conductors 59 and 60. To set the motor in operation, a spring-resisted push-button or other suitable switch 65' is used to close a circuit through a conductor 66 which includes an electromagnet or solenoid 67 adapted to raise a rod 68 to cause an arm 69 attached to it to close a circuit between a pair of contactors 70 and 71. This closes a circuit through conductors 72 and 75, armature 51, a conductor 76, contact band 55, contactor 58 and a conductor 77. The arrangement is here such that at or about the time shoulder 34 of cam 33 (Fig. 3) reaches finger 31, motor 40 causes shaft 1 to rotate at or about the rate of rotation of driving clutch member 25. To resist acceleration of the rotation of the power shaft on the downward stroke of head 5, motor 40 is caused to act as a generator, this being after clutch engagement has been made. At this time in the cycle of rotation of the power shaft, contactor 58 engages insulation block 56 to interrupt the armature circuit through conductors 76 and 77, and throw into such circuit a resistance 78.

After the completion of the cutting stroke of head 5, the supplemental motor is again operated to itself rotate the power shaft so that the driven may be readily disengaged from the driving clutch member. The operation of the motor is thus again restored when the portion of conducting band 55 at the left of insulation block 56 is again engaged by contactor 58.

To maintain switch rod 68 in its upper position after switch 65 has been released, rod 68 is provided with a second conducting arm 80, which, in the upper position of the rod, closes a circuit through a pair of contactors 81 and 82 connected to two shunt circuit conductors 83 and 84, the latter of which is connected to stationary contactor 57. This circuit is broken to permit rod 68 to move downwardly, and thereby break the armature circuit between conductors 72 and 73, when stationary contactor 57 is in engagement with insulation block 54 of the rotatable drum. Upon thus breaking a circuit through the motor armature, a brake 86 is spring pressed upon the armature shaft, such brake having been released from the armature shaft by an electromagnet 87 placed in the portion of the armature circuit formed by conductor 76. Further dynamic braking may be applied to the motor by closing a self-contained circuit through the armature upon the breaking of the regular armature circuit. Such circuit may be established through arm 80, a pair of contactors 88 and 89, and conductors 90 and 91, this circuit being complete in itself without any connection to line conductors 61 and 62.

In the operation of the illustrative embodiment of the invention, driving clutch member 25 is continuously rotated by a motor 9 through the train of connections shown in Fig. 1, these including gear 8 to which the driving member is attached. When it is desired to operate the shear, supplemental motor 40 is caused to operate to impart initial rotation to power shaft 1 to bring it up to a rate of rotation substantially that of driving member 25 before driven member 28 is released by finger 31 to permit it to be moved into engagement with the driving member. The motor is then caused to operate as a generator to resist acceleration of the power shaft as reciprocating head 5 connected to it moves downwardly. After the power stroke of the reciprocating head, motor 40 is again operated to itself rotate the power shaft so that driven member 28 may be easily disengaged from driving member 25. Thereafter, the supplemental motor and brake 86 act to stop the rotation of the power shaft with its eccentric 3 in its uppermost position. In this way the members of the clutch may be brought into engagement with each other without shock and consequent liability of breakage of clutch teeth, and disengagement of the clutch members is greatly facilitated.

According to the provisions of the patent statutes, I have explained the principle and operation of my invention, and have illustrated and described a typical embodiment of it. However, I desire to have it understood that, within the scope of the appended claims, the invention may be practiced otherwise than as specifically illustrated and described.

I claim as my invention:

1. In a clutch, the combination of a driving clutch member, means for continuously rotating said member, a normally stationary but rotatable driven clutch member, means for moving one into engagement with the other of said clutch members, a motor, and driving connections from said motor to said driven clutch member for intermittently imparting rotation to the latter in the direction of rotation of said driving clutch member prior to the operation of said clutch-moving means.

2. In a clutch, the combination of a driving clutch member, means for continuously rotating said member, a normally stationary but rotatable driven clutch member, means for moving said driven clutch member into engagement with said driving clutch member, a motor, and driving connections from said motor to said driven clutch member for intermittently imparting rotation to the latter in the direction of rotation of said driving clutch member, to facilitate engagement of said driven clutch member with said driving clutch member.

3. In a clutch, the combination of a continuously rotatable driving clutch member, a longitudinally movable driven clutch member provided with a shifting cam, yielding means for urging said driven clutch member toward said driving clutch member, a fixed finger cooperating with said cam for determining the position of said driven clutch member, and means for rotating said driven clutch member in the direction of said driving clutch member to cause the former to be moved into engagement with the latter and to reduce clutch-engagement shock.

4. In a clutch, the combination of a continuously rotatable driving clutch member, a power shaft, a driven clutch member, mounted for longitudinal movement on and for rotation with said shaft and provided with a shifting cam, a fixed finger cooperating with said cam to move said driven clutch member in one direction, means for yieldingly urging the cam of said driven clutch member against said finger, and means for rotating said driven clutch member in the direction of rotation of said driving clutch member to cause the former to be moved into engagement with the latter and to reduce clutch-engagement shock.

5. In a clutch, the combination of a continuously rotatable driving clutch member, a power shaft, a driven clutch member mounted for longitudinal movement on and for rotation with said shaft and yieldingly urged towards said driving clutch member and provided with a shifting cam, a fixed finger cooperating with said cam to move said driven clutch member from and hold it out of engagement with said driving clutch member, and means for rotating said driven clutch member in the direction of rotation of said driving clutch member to move said cam from engagement with said finger and to reduce clutch-engagement shock.

6. In a clutch, the combination of a continuously rotatable driving clutch member, a power shaft, a driven clutch member mounted for longitudinal movement on and for rotation with said shaft and provided with a shifting cam, a fixed finger cooperating with said cam to move said driven clutch member in one direction, means for yieldingly urging the cam of said driven clutch member against said finger, a motor and driving connections between it and said driven clutch member for rotating the latter in the direction of rotation of said driving clutch member to cause the driven clutch member to be moved into engagement with the driving clutch member, and means effective upon the rotation of said shaft to increase the speed of said motor to facilitate the disengagement of said driven clutch member from said driving clutch member.

7. In a clutch, the combination of a continuously rotatable driving clutch member, a power shaft, a driven clutch member mounted for longitudinal movement on and for rotation with said shaft and yieldingly urged towards said driving clutch member and provided with a shifting cam, a fixed finger cooperating with said cam to move said driven clutch member from and hold it out of engagement with said driving clutch member, a motor and driving connections between it and said shaft and driven clutch member for rotating them to move said cam from engagement with said finger, and means effective upon the rotation of said shaft to increase the speed of said motor to facilitate disengagement of said driven clutch member from said driving clutch member.

In testimony whereof, I sign my name.

JOHN A. SMITMANS.